(12) United States Patent
Tetsuka (10) Patent No.: US 10,269,249 B2
(45) Date of Patent: Apr. 23, 2019

(54) BICYCLE NOTIFICATION DEVICE INCLUDING ATTACHING PORTION, TRANSMITTER AND POWER GENERATOR

(71) Applicant: Shimano Inc., Sakai, Osaka (JP)

(72) Inventor: Toshio Tetsuka, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 15/487,888

(22) Filed: Apr. 14, 2017

(65) Prior Publication Data

US 2018/0301035 A1 Oct. 18, 2018

(51) Int. Cl.
| | | |
|---|---|---|
| *G08B 21/00* | (2006.01) | |
| *G08G 1/16* | (2006.01) | |
| *H04B 1/034* | (2006.01) | |
| *H04B 1/04* | (2006.01) | |
| *B62J 6/20* | (2006.01) | |

(52) U.S. Cl.
CPC ............ *G08G 1/166* (2013.01); *G08G 1/161* (2013.01); *H04B 1/034* (2013.01); *H04B 1/04* (2013.01); *B62J 6/20* (2013.01)

(58) Field of Classification Search
CPC ............................. G08G 1/166; H04B 1/3822
USPC ........................................................ 340/902
See application file for complete search history.

(56) References Cited

U.S. PATENT DOCUMENTS

| | | | |
|---|---|---|---|
| 7,079,024 B2 | 7/2006 | Alarcon | |
| 2005/0156590 A1* | 7/2005 | Nagae | G08C 17/00 324/167 |
| 2006/0240947 A1* | 10/2006 | Qu | A63B 24/0084 482/1 |
| 2009/0030605 A1* | 1/2009 | Breed | B60N 2/2863 701/532 |
| 2009/0243895 A1* | 10/2009 | Mitchell | H01Q 1/007 340/971 |
| 2011/0012729 A1* | 1/2011 | Hess | G08B 13/1409 340/539.13 |
| 2012/0075874 A1* | 3/2012 | Sherwin | B62J 6/00 362/473 |
| 2012/0200401 A1* | 8/2012 | Goldwater | B62J 6/20 340/432 |
| 2013/0127638 A1* | 5/2013 | Harrison | G08G 1/166 340/903 |

(Continued)

FOREIGN PATENT DOCUMENTS

| | | |
|---|---|---|
| DE | 10 2013 012 702 A1 | 2/2015 |
| GB | 2485843 A | 5/2012 |
| GB | 2508500 A | 6/2014 |

(Continued)

*Primary Examiner* — Mark S Rushing
(74) *Attorney, Agent, or Firm* — Global IP Counselors, LLP (57) ABSTRACT

[Problem] To provide a vehicle notification device that allows others to easily recognize the vehicle.
[Solution] A vehicle notification device comprises a base portion, an attaching portion that is provided on the base portion and that can be attached to or detached from a rotating body of a vehicle that is configured to be run by a manual drive force, a wireless transmitter configured to transmit a wireless signal that notifies the presence of itself to an external device that is external to the vehicle, and a power generator that generates electric power supplied to the wireless transmitter.

21 Claims, 5 Drawing Sheets

(56) References Cited

U.S. PATENT DOCUMENTS

| | | | | |
|---|---|---|---|---|
| 2014/0035737 A1* | 2/2014 | Rashid | ............... | B60Q 9/008 340/435 |
| 2016/0076644 A1* | 3/2016 | Ooshima | ............. | F16D 48/06 701/51 |

FOREIGN PATENT DOCUMENTS

| | | | |
|---|---|---|---|
| JP | 02-005200 | A | 1/1900 |
| JP | 07-246879 | A | 9/1995 |
| JP | 2001-322582 | A | 11/2001 |
| JP | 2002-099989 | A | 4/2002 |
| JP | 2004-150837 | A | 5/2004 |
| JP | 2004-237834 | A | 8/2004 |
| JP | 2008-143221 | A | 6/2008 |
| JP | 2008-143222 | A | 6/2008 |
| JP | 4847156 | B2 | 12/2011 |
| WO | 2011/137477 | A1 | 11/2011 |
| WO | 2016/115259 | A1 | 7/2016 |

\* cited by examiner

BICYCLE NOTIFICATION DEVICE INCLUDING ATTACHING PORTION, TRANSMITTER AND POWER GENERATOR

BACKGROUND

Field of the Invention

The present invention relates to a vehicle notification device.

Background Information

For example, a bell is used to notify the surroundings of the presence of a vehicle.

Since the sound of a bell is hard to hear in the interior of an automobile, it is difficult to recognize a vehicle even if a bell is ringing.

SUMMARY OF THE INVENTION

An object of the present invention is to provide a vehicle notification device that allows others to easily recognize a vehicle.

A vehicle notification device according to one aspect of the present invention comprises a base portion, an attaching portion that is provided on the base portion and that can be attached to or detached from a rotating body of a vehicle that is configured to be run by a manual drive force; a wireless transmitter that is configured to transmit a wireless signal that notifies the presence of the vehicle to a device that is external to the vehicle; and a power generator that generates electric power that can be supplied to the wireless transmitter.

According to the first aspect described above, since it is possible for the vehicle to notify the presence of itself by a wireless transmitter, it becomes easy for others to recognize the vehicle. In addition, since a power generator is included, it is possible to reduce the trouble of replacing a battery, or to eliminate the necessity of replacing a battery.

In a second aspect according to the vehicle notification device according to the first aspect, the attaching portion is configured to be attachable to a rotating body, such that the base portion is exposed to the outside of the rotating body.

According to the second aspect, it is possible to suppress the wireless signal that is transmitted from the wireless transmitter from being disturbed by the rotating body. Further, it is possible to easily attach the vehicle notification device to the rotating body.

In a vehicle notification device of a third aspect according to the first aspect or the second aspect, the rotating body comprises a spoke and the attaching portion is configured to be attachable to the spoke.

According to the third aspect, since it is not necessary to provide a new element for attaching a vehicle notification device to the bicycle, versatility is high.

In a vehicle notification device, a fourth aspect according to the first aspect or the second aspect, the rotating body comprises a crank, and the attaching portion is attachable to the crank.

According to the fourth aspect, since it is not necessary to provide a new element for attaching a vehicle notification device to the bicycle, versatility is high.

In a vehicle notification device, a fifth aspect according to any one of the first to fourth aspects, the power generator comprises a rotor that is rotated together with rotation of the rotating body and a coil that is electromagnetically induced by the rotation of the rotor.

According to the fifth aspect, the power generator can generate power by the rotating body being rotated.

In a vehicle notification device, a sixth aspect according to any one of the first to fifth aspects, the power generator comprises a piezoelectric element that generates, by vibration, power that is applied to the power generator.

When a bicycle is running, vibration is generated in the rotating body. Therefore, according to the sixth aspect, electric power is appropriately supplied to the wireless transmitter when the bicycle is running.

In a vehicle notification device, a seventh aspect according to any one of the first to sixth aspects, the power generator comprises a photoelectric element that generates power by sunlight.

According to the seventh aspect, electric power can be supplied to the wireless transmitter even when the rotating body is not being rotated.

In a vehicle notification device, an eighth aspect according to any one of the first to seventh aspects comprises a power storage device for storing electric power that is generated by the power generator.

According to the eighth aspect, it is possible to stably supply electric power to the wireless transmitter.

In a vehicle notification device, a ninth aspect according to any one of the first to eighth aspects, of providing the power generator on the base portion.

According to the ninth aspect, since the power generator can be attached to the rotating body by attaching the attaching portion to the rotating body, it becomes easy to attach the vehicle notification device.

In a vehicle notification device, a tenth aspect according to any one of the first to ninth aspects further comprises a first detector that detects a traveling speed of the vehicle, and the wireless transmitter is configured for transmitting a wireless signal including information according to a detection result of the first detector to the external device.

According to the tenth aspect, information relating to the traveling speed of the vehicle can be transmitted to a device that is external to the vehicle.

In a vehicle notification device, an eleventh aspect according to the tenth aspect wherein the first detector includes an acceleration sensor.

According to the eleventh aspect, it is possible to minimize restrictions on the attachment position of the first detector by using an acceleration sensor.

In a vehicle notification device, a twelfth aspect according to any one of the first to eleventh aspects further comprises a second detector that detects position information of the vehicle, and the wireless transmitter is configured to transmit the wireless signal including information according to an output of the second detector to the external device.

According to the twelfth aspect, information relating to the position of the vehicle can be transmitted to a device that is external to the vehicle.

In a vehicle notification device, a thirteenth aspect according to the twelfth aspect wherein the second detector includes a GPS receiver.

According to the thirteenth aspect, the position of the vehicle can be accurately detected.

In a vehicle notification device, a fourteenth aspect according to any one of the first to thirteenth aspects further comprises a storage device that stores information relating to the type of the vehicle, and the wireless transmitter is configured to transmit the wireless signal, including information relating to the type of the vehicle, to the external device.

According to the fourteenth aspect, information relating to the type of the vehicle can be transmitted to a device that is external to the vehicle.

In a vehicle notification device, a fifteenth aspect according to the fourteenth aspect wherein the storage device is configured to update the type of the vehicle that is stored in the storage device.

According to the fifteenth aspect, it is possible to transmit appropriate information relating to the type of vehicle to a device that is external to the vehicle, according to the type of vehicle to which the vehicle notification device is mounted.

In a vehicle notification device, in a sixteenth aspect according to the fifteenth aspect further comprises a wireless receiver, and the storage device is configured to be configured to update information that is stored in the storage device according to a signal from the outside that is input to the wireless receiver.

According to the sixteenth aspect, it is possible to easily update information in the storage device by a device that is external to the vehicle notification device.

In a vehicle notification device, a seventeenth aspect according to any one of the first to sixteenth aspects, wherein the wireless transmitter is provided on the base portion.

According to the seventeenth aspect, since the wireless transmitter can be attached to the rotating body by attaching the attaching portion to the rotating body, it becomes easy to attach the vehicle notification device.

In a vehicle notification device, an eighteenth aspect according to any one of the first to seventeenth aspects, wherein the base portion comprises a housing that houses the wireless transmitter and the power generator.

According to the eighteenth aspect, the wireless transmitter and the power generator are protected by the housing.

In a vehicle notification device, a nineteenth aspect according to the eighteenth aspect, wherein at least a portion of the housing is formed from a material that is configured to transmit wireless radio waves.

According to the nineteenth aspect, it is possible to appropriately transmit a wireless signal of the wireless transmitter to a device that is external to the vehicle.

In a vehicle notification device, a twentieth aspect according to any one of the first to nineteenth aspects, wherein the base portion comprises a reflective sheet that reflects light.

According to the twentieth aspect, visibility of the base portion is increased.

In a vehicle notification device, a twenty-first aspect according to any one of the first to twentieth aspects, wherein the transmission frequency of the wireless transmitter is in the 700-900 MHz band, the 1700-3500 MHz band, or the 5900 MHz band.

The twenty-first aspect is suitable for communication with an IoT (Internet of Things).

According to the vehicle notification device of the present invention, it becomes easy for others to recognize a vehicle.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
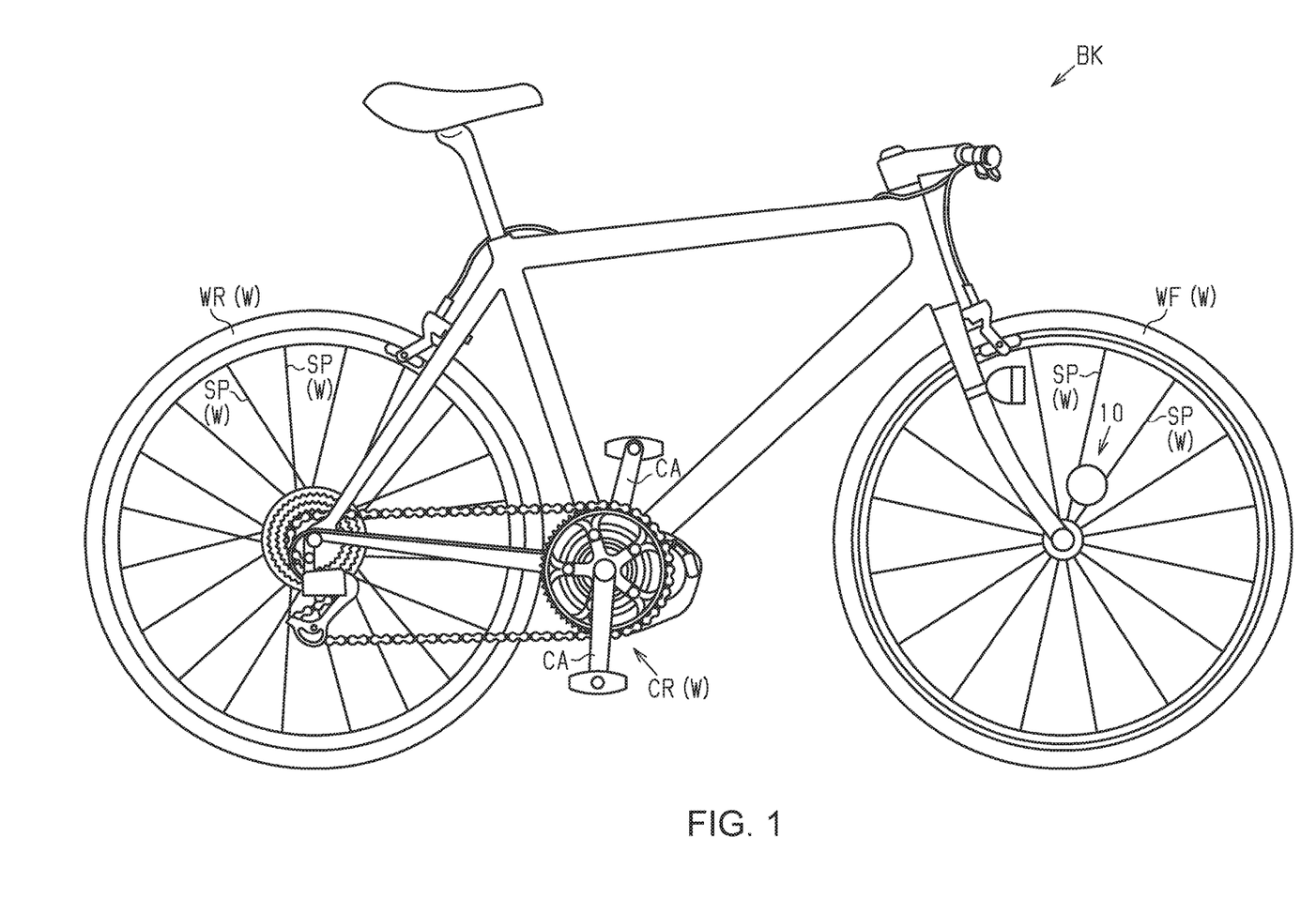
FIG. 1 is a side view of a bicycle equipped with the vehicle notification device of the present embodiment.

As shown in FIG. 1, the vehicle notification device 10 is mounted on a vehicle BK that is configured to be run by manual drive force (hereinafter simply referred to as "vehicle BK"). The vehicle BK includes a bicycle, a kick skater, a skateboard, a roller skate, a foot-kick riding toy, a wheelchair, a cart, a stroller, and a rear car. In FIG. 1, a bicycle is shown as one example of a vehicle BK. The vehicle BK may travel on a road, etc., in the same manner as other vehicles. Examples of other vehicles include automobiles and bicycles. An external device ED1 external to the vehicle BK (refer to FIG. 3) for detecting the vehicle BK is known as a device that is mounted on other vehicles. The vehicle notification device 10 is configured to notify the presence of the vehicle BK to the external device ED1 external to the vehicle BK (refer to FIG. 3). A vehicle comprising the external device ED1 external to the vehicle BK (refer to FIG. 3) is configured to receive a signal transmitted from the vehicle notification device 10 to detect the presence of the vehicle BK. The external device ED1 external to the vehicle BK includes at least one of a display unit and a sound output unit, and is configured to be mountable on a vehicle. The external device ED1 external to the vehicle BK includes, for example, a car navigation device.

The vehicle BK comprises a rotating body W. Examples of a rotating body W include a front wheel WF, a rear wheel WR, a crank CR, and a pedal. In the present embodiment, the rotating body W includes a spoke SP. The vehicle notification device 10 is attached to a portion of the vehicle BK from which a signal can be appropriately transmitted to another vehicle. In one example, the vehicle notification device 10 is attached to the rotating body W. The vehicle notification device 10 is attached to at least one of a spoke SP of the front wheel WF and a spoke SP of the rear wheel WR. In the first example shown in FIG. 1, the vehicle notification device 10 is attached to the spoke SP of the front wheel WF. In a second example, the vehicle notification device 10 is attached to the spoke SP of the rear wheel WR. In a third example, the vehicle notification device 10 is attached to the spoke SP of the front wheel WF and the spoke SP of the rear wheel WR.

Figure 2:
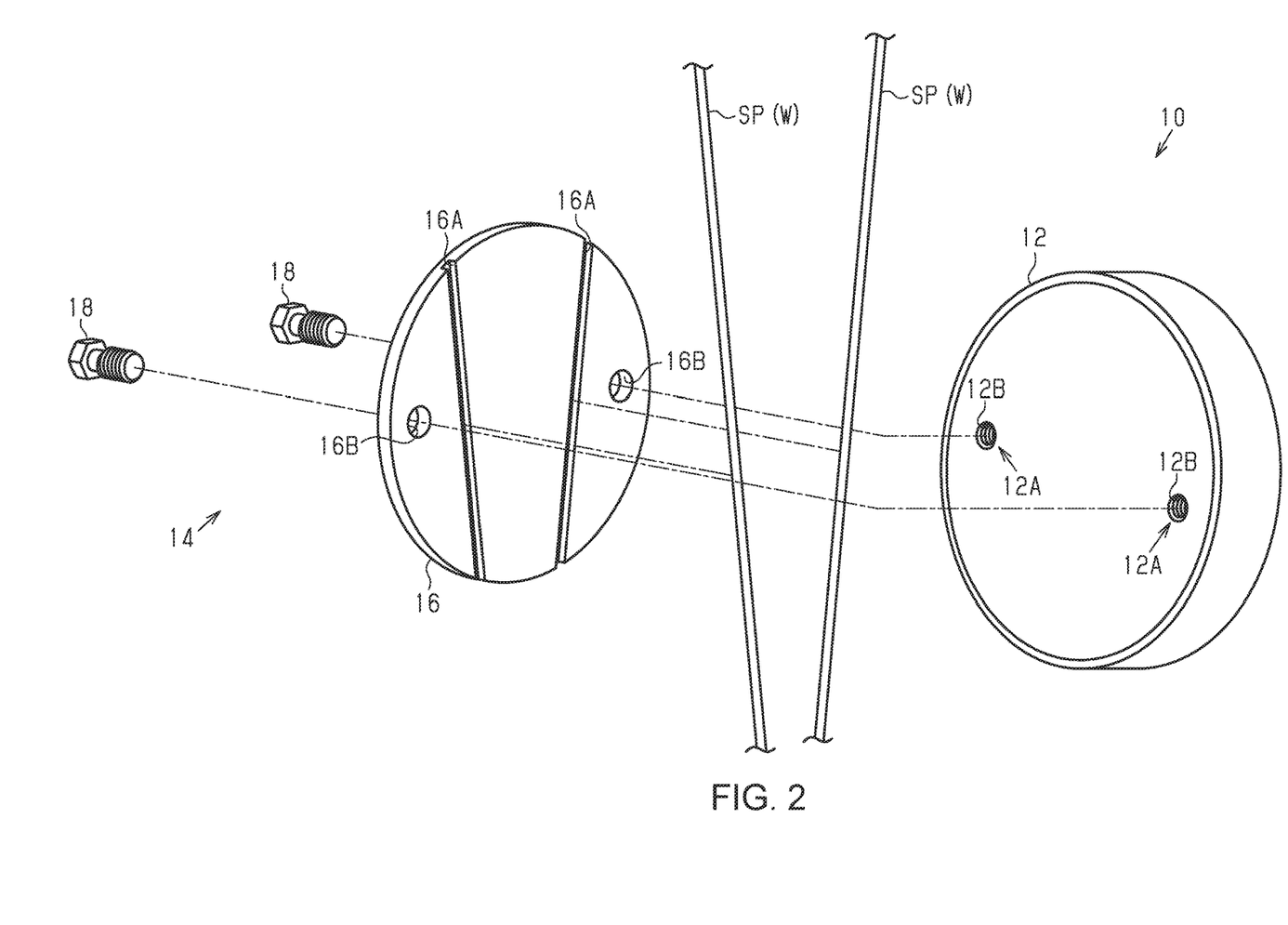
FIG. 2 is an enlarged perspective view of a bicycle spoke and a vehicle notification device.

As shown in FIG. 2, the vehicle notification device 10 comprises a base portion 12 and an attaching portion 14. The attaching portion 14 is connected to the base portion 12. The attaching portion 14 can be attached to or detached from the rotating body W of the vehicle BK. The attaching portion 14 is configured to be attachable to the rotating body W such that the base portion 12 is exposed outside of the rotating body W. In one example, the attaching portion 14 is configured to be attachable to the spoke SP of the rotating body W. One or a plurality of holes 12A are formed in the base portion 12. In the example shown in FIG. 2, two holes 12A are formed in the base portion 12. A female thread 12B is formed in the hole 12A. The attaching portion 14 comprises a mounting plate 16 and bolts 18. The mounting plate 16 is configured separately from the base portion 12. Each bolt 18 is inserted in the mounting plate 16 and the base portion 12. In a preferred embodiment, a sealing material 18A (refer to FIG. 5) is provided on the male thread of the bolt 18. One or a plurality of grooves 16A, and, one or a plurality of holes 16B are formed in the mounting plate 16. In the example shown in FIG. 2, two grooves 16A and two holes 16B are formed in the mounting plate 16. The groove 16A is formed so as to be configured to partially house the spoke SP.

In one example, the vehicle notification device 10 is attached to the spoke SP in the following manner. First, the mounting plate 16 is attached to the spoke SP such that the spoke SP is partially housed in the groove 16A. Next, the base portion 12 is aligned with the mounting plate 16 such that the spoke SP is sandwiched between the mounting plate 16 and the base portion. Next, the bolt 18 is inserted in the hole 16B of the mounting plate 16 and the hole 12A of the base portion 12, and the bolt 18 is connected with the female thread 12B of the base portion 12. It is possible to prevent the vehicle notification device 10 from rotating around the axis of the spoke SP by housing a spoke SP in each of the two grooves 16A.

Figure 3:
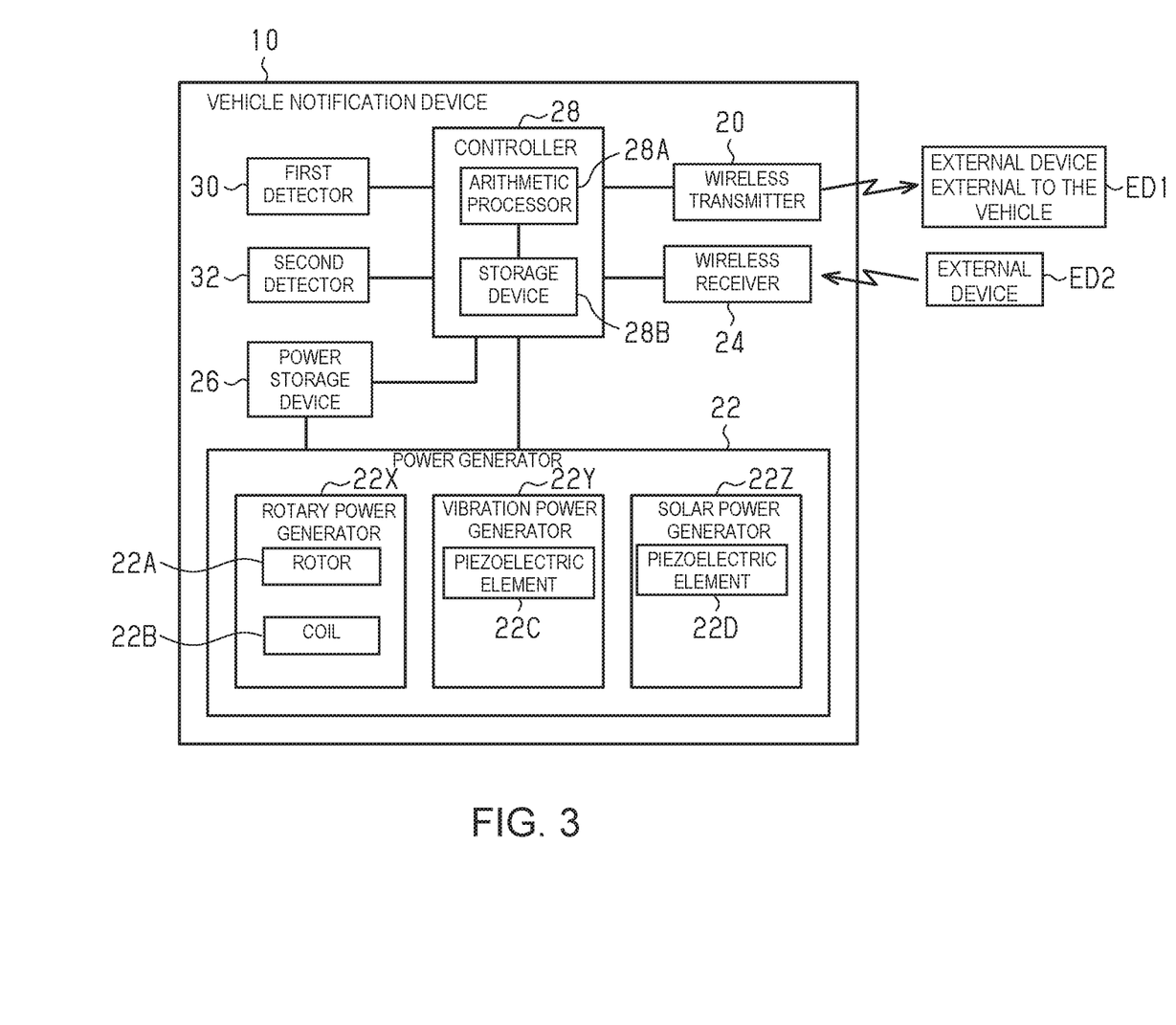
FIG. 3 is a block diagram showing the electrical configuration of the vehicle notification device.

As shown in FIG. 3, the vehicle notification device 10 includes a wireless transmitter 20 and a power generator 22. The wireless transmitter 20 is configured to transmit a wireless signal that notifies the presence of itself to the external device ED1 disposed externally to the vehicle BK. The power generator 22 generates electric power that can be supplied to the wireless transmitter 20. In a preferred embodiment, the vehicle notification device 10 further comprises a wireless receiver 24, a power storage device 26, a controller 28, a first detector 30, and a second detector 32. The controller 28 is electrically connected to the wireless transmitter 20, the power generator 22, the wireless receiver 24, the power storage device 26, the first detector 30, and the second detector 32. Information that is received by the wireless receiver 24 and the detection results of the detectors 30, 32 are transmitted to the controller 28.

The first detector 30 detects the traveling speed of the vehicle BK. The first detector 30 includes a sensor configured to detect the traveling speed of the vehicle BK. In one example, the first detector 30 includes an acceleration sensor. The first detector 30 detects the traveling speed of the vehicle BK by integrating the detected values of the acceleration sensor. The second detector 32 detects position information of the vehicle BK. In one example, the second detector 32 includes a GPS (Global Positioning System) receiver.

The controller 28 comprises one or a plurality of arithmetic processors 28A and a storage device 28B. In the first example, the arithmetic processor 28A comprises a CPU (Central Processor) or an MPU (Micro Processor). In the second example, the arithmetic processor 28A comprises common circuits, such as an input interface circuit and an output interface circuit, in addition to the CPU or the MPU.

The storage device 28B stores information relating to the type of the vehicle BK. Types of vehicles BK include a bicycle, a kick skater, a skateboard, a roller skate, a foot-kick riding toy, a wheelchair, a cart, a stroller, and a rear car. In a preferred embodiment, the storage device 28B further stores one or a plurality from among various control programs, information used for various control processes, information relating to the traveling speed of the vehicle BK, and position information of the vehicle BK. The storage device 28B is configured to update the stored information by a prescribed updating method. In a first updating method, information that is stored in the storage device 28B is updated by an external device ED2. The external device ED2 is a separate device from the vehicle notification device 10 and the external device ED1 external to the vehicle BK. The external device ED2 comprises a wireless transmitter that is configured to transmit a wireless signal to the outside, and a wireless receiver that is configured to receive a wireless signal that is output by the vehicle notification device. Examples of an external device ED2 include portable devices, such as a smartphone, a tablet computer, and a laptop personal computer, and an operating unit of the vehicle BK. The storage device 28B is configured to update information that is stored in the storage device 28B according to a signal from the outside that is input to the wireless receiver 24. In a second updating method, information that is stored in the storage device 28B is updated by an operating unit (not shown) provided to the vehicle notification device 10.

Figure 4:
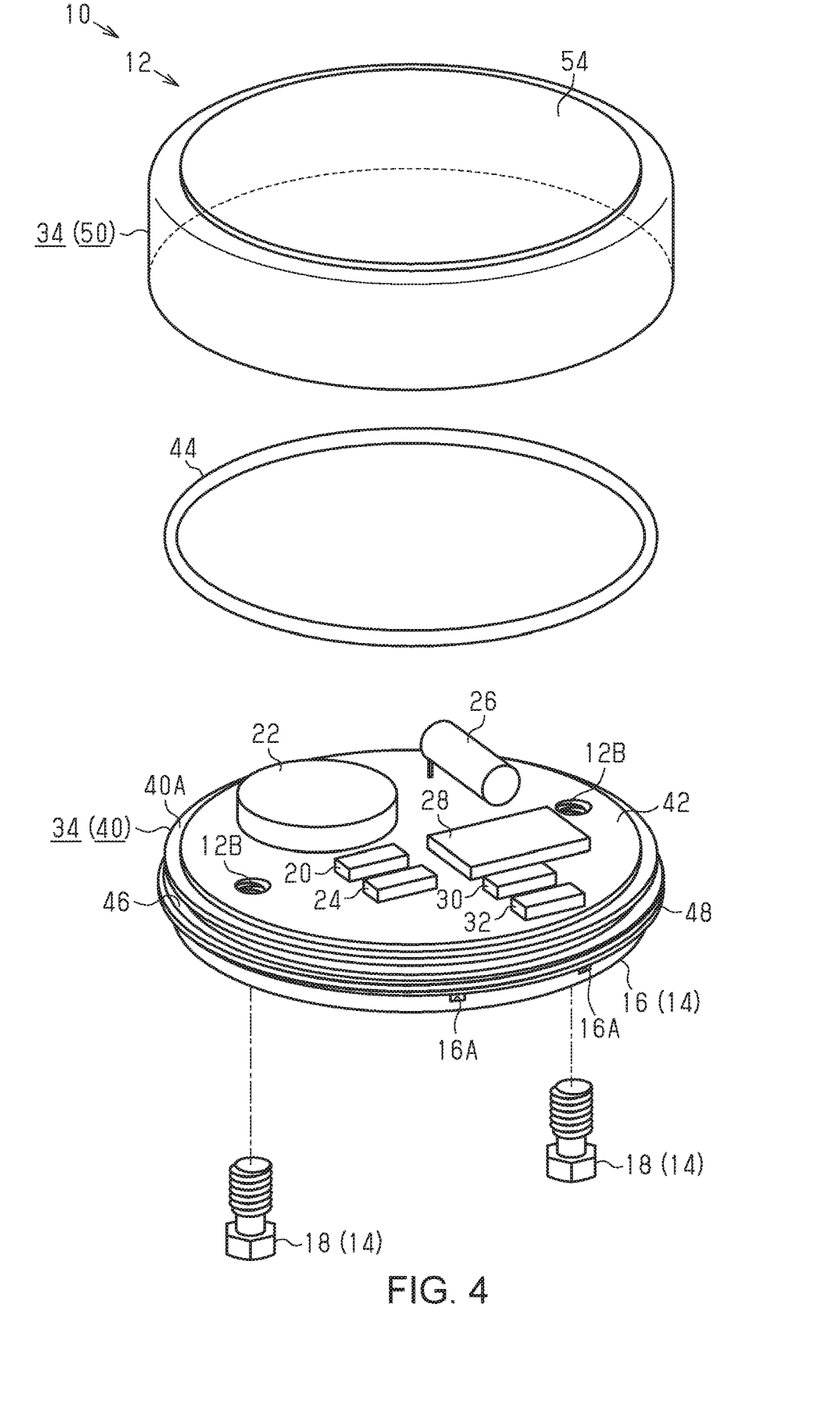
FIG. 4 is an exploded perspective view of the vehicle notification device of the present embodiment.

In a preferred example, the wireless transmitter 20 and the wireless receiver 24 are housed in a package (not shown). In a first example, the wireless transmitter 20 and the wireless receiver 24 are housed in individual packages. In a second example, the wireless transmitter 20 and the wireless receiver 24 are housed in one package. FIG. 4 shows the first example.

The external device ED2 has a function to check whether or not the vehicle notification device 10 is operating normally. For example, if a user holds a smartphone, which is an external device ED2, over the vehicle notification device 10, a wireless signal that is output by the vehicle notification device 10 is received by the wireless receiver of the external device ED2. The external device ED2 determines that the vehicle notification device 10 is operating normally based on the received wireless signal, and provides the result to the user. According to one example of a providing method, information indicating that the vehicle notification device 10 is operating normally is displayed on a display unit of the external device ED2.

The wireless transmitter 20 is configured to transmit wireless signals that include various information to the external device ED1 external to the vehicle BK. In a first example, the wireless transmitter 20 is configured to transmit wireless signals that include information according to the detection result of the first detector 30 to the external device ED1 external to the vehicle BK. In a second example, the wireless transmitter 20 is configured to transmit wireless signals that include information according to the detection result of the second detector 32 to the external device ED1 external to the vehicle BK. In a third example, the wireless transmitter 20 is configured to transmit wireless signals that include information relating to the type of the vehicle BK to the external device ED1 external to the vehicle BK. The wireless transmitter 20 shown in FIG. 3 is configured to transmit wireless signals that include all the information of the first to third examples to the external device ED1 external to the vehicle BK.

The wireless transmitter 20 transmits a wireless signal of a transmission frequency in a prescribed frequency band to the external device ED1 external to the vehicle BK. The transmission frequency is a frequency band that is, for example, suitable for communication with an IoT (Internet of Things). In a first example, the transmission frequency is in the 700-900 MHz band. In a second example, the transmission frequency is in the 1700-3500 MHz band. In a third example, the transmission frequency is in the 5900 MHz band. The transmission frequency may include a plurality of frequencies; for example, two or more frequencies from among the 700-900 MHz band, the 1700-3500 MHz band, and the 5900 MHz band may be included.

The wireless receiver 24 is configured to receive the wireless signal that is output by the external device ED2. The controller 28 updates the information stored in the storage device 28B based on the wireless signal that is received by the wireless receiver 24. The wireless signal that is output by the external device ED2 includes information for updating the information stored in the storage device 28B. One example of such information includes information relating to the type of the vehicle BK.

The power generator 22 is configured to supply electric power to the controller 28. The power generator 22 is configured to supply electric power via the controller 28 to the wireless transmitter 20, the wireless receiver 24, the first detector 30 and the second detector 32. The power generator 22 includes at least one of a rotary power generator 22X, a vibration power generator 22Y and a solar power generator 22Z. The power generator 22 illustrated in FIG. 3 includes a rotary power generator 22X, a vibration power generator 22Y and a solar power generator 22Z. One example of a rotary power generator 22X is an automatic winding generator. The rotary power generator 22X comprises a rotor 22A that is rotated together with the rotation of the rotating body of the vehicle BK, and a coil 22B that is electromagnetically induced by the rotation of the rotor 22A. The rotor 22A includes a permanent magnet. In the present embodiment, the rotor 22A is rotated by the centrifugal force as well as the acceleration in the rotational direction accompanying the rotation of the front wheel WF (refer to FIG. 1). The vibration power generator 22Y comprises a piezoelectric element 22C that generates power by vibration that is applied to the vibration power generator 22Y. The solar power generator 22Z comprises a photoelectric element 22D that generates power by sunlight. The photoelectric element 22D is provided on the outer surface portion of the base portion 12.

The power storage device 26 is configured to store electric power that is generated by the power generator 22. The power storage device 26 is configured to supply electric power to the controller 28. The power storage device 26 is configured to supply electric power to the wireless transmitter 20, the controller 28, the first detector 30, and the second detector 32, via the controller 28. Examples of a power storage device 26 include a capacitor and a secondary battery. The power storage device 26 has a charging capacity with which the wireless transmitter 20 is able to transmit signals for a predetermined time from a fully charged state, in a state in which the power generator 22 is not generating power. The predetermined time is five minutes or more, and preferably one hour or more.

Figure 5:
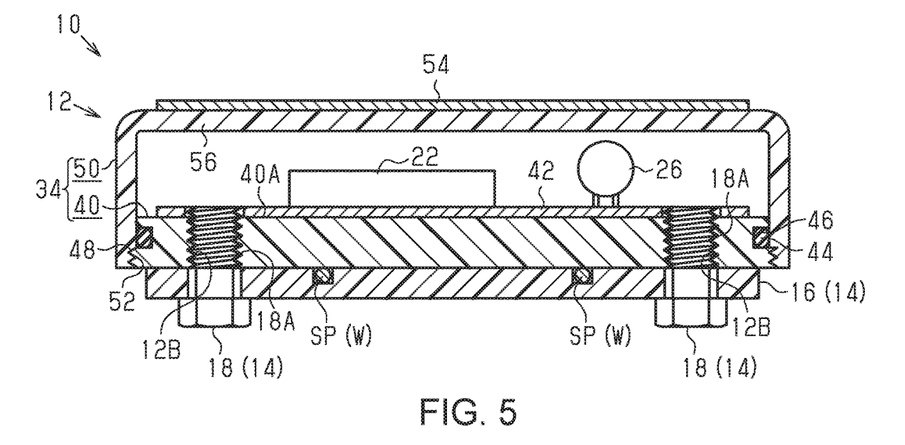
FIG. 5 is a cross-sectional view of the vehicle notification device.

As shown in FIG. 4 and FIG. 5, the base portion 12 comprises a housing 34. The housing 34 houses the wireless transmitter 20 and the power generator 22. In a preferred example, the housing 34 further houses the wireless receiver 24, the power storage device 26, the controller 28, the first detector 30, and the second detector 32. In one example, the housing 34 comprises a first housing portion 40 and a second housing portion 50. At least a portion of the housing 34 is formed from a material that is configured to transmit wireless radio waves. In a first example, the first housing portion 40 is formed from a material that is configured to transmit radio waves. In a second example, the second housing portion 50 is formed from a material that is configured to transmit radio waves. In a third example, each of the housing portions 40, 50 is formed from a material that is configured to transmit radio waves. At least a portion of the housing is formed from a resin material that is configured to transmit wireless radio waves.

The wireless transmitter 20 and the power generator 22 are provided on the base portion 12. In a preferred example, the wireless receiver 24, the power storage device 26, the controller 28, the first detector 30, and the second detector 32 are provided on the base portion 12. The base portion 12 comprises a circuit board 42 and a seal member 44. The wireless transmitter 20, the power generator 22, the wireless receiver 24, the power storage device 26, the first detector 30, and the second detector 32 (hereinafter referred to as "wireless transmitter 20 etc.") are installed on the circuit board 42. The circuit board 42 is attached to the upper surface 40A of the first housing portion 40. The seal member 44 creates a seal between the first housing portion 40 and the second housing portion 50. The seal member 44 is formed of an elastic body. In one example, the seal member 44 is an O-ring.

The first housing portion 40 has a disc shape. The first housing portion 40 comprises a female thread 12B, a mounting recess 46, and a male thread 48. The mounting recess 46 and the male thread 48 are formed on the outer perimeter portion of the first housing portion 40. The seal member 44 is attached to the mounting recess 46. The hole 12A is provided extending through the first housing portion 40. A hole that is linked to the hole 12A is formed on the circuit board 42. The hole 12A may be formed so as to not extend through the first housing portion 40.

The second housing portion 50 houses the circuit board 42 and the wireless transmitter 20 etc. The second housing portion 50 has a shape in which one end of a cylindrical member is closed. The second housing portion 50 comprises a female thread 52 (refer to FIG. 5) that is linked to the male thread 48. The female thread 52 is formed on the inner perimeter portion of the cylindrical portion of the second housing portion 50. The second housing portion 50 is attached to the first housing portion 40. In one example, as shown in FIG. 5, the housing portions 40, 50 are joined by the male thread 48 of the first housing portion 40 and the female thread 52 of the second housing portion 50 being linked. The means for joining the housing portions 40, 50 is not limited to a female thread and a male thread. For example, the housing portions 40, 50 may be joined by other methods, such as adhesion, welding, press fitting, and fastening by a bolt, or the like. While the housing 34 of the present embodiment is formed in a cylindrical shape, no limitation is imposed thereby, and various shapes may be employed, such as a quadrangular prism shape or a spherical shape.

The base portion 12 comprises a reflective sheet 54 that reflects light. The shape and the attachment position of the reflective sheet 54 may be freely selected. In one example, as shown in FIG. 4, the shape of the reflective sheet 54 is a disc shape. As shown in FIG. 5, the reflective sheet 54 is attached to a wall portion 56 that opposes the circuit board 42, within the second housing portion 50. Examples of the means for attaching the reflective sheet 54 to the wall portion 56 include an adhesive or a double-sided tape. In another example, the reflective sheet 54 is integrally formed as a part of the second housing portion 50.

As shown in FIG. 5, in a state in which the housing portions 40, 50 are joined, the seal member 44 is compressed by the housing portions 40, 50. Accordingly, the waterproof performance is enhanced.

The operation of the vehicle notification device 10 will be described, with reference to FIG. 3. When electric power is being supplied from the power storage device 26 to the wireless transmitter 20, the wireless transmitter 20 is driven. The wireless transmitter 20 transmits a wireless signal to the external device ED1 external to the vehicle BK at predetermined time intervals. The wireless signals include information for notifying the presence of the vehicle BK, information relating to the type of the vehicle BK, information relating to the traveling speed of the vehicle BK, and information relating to the position information of the vehicle BK. If an automobile (another vehicle) equipped with the external device ED1 external to the vehicle BK is traveling within the propagation range of the wireless signal, the external device ED1 external to the vehicle BK receives the wireless signal. The external device ED1 external to the vehicle BK is configured to output information indicating the presence of the vehicle BK, the type of the vehicle BK, and the position of the vehicle BK, using at least one of a display unit and a sound output unit, from the received wireless signal. The external device ED1 external to the vehicle BK is further configured to output whether or not the vehicle BK is traveling, and if the vehicle BK is traveling, the traveling speed and the movement direction of the vehicle BK, using at least one of a display unit and a sound output unit, from the received wireless signal. The control device of the automobile is configured to predict the behavior of the vehicle BK on the basis of the information acquired by the external device ED1 external to the vehicle BK, which can be used, for example, for controlling the automatic driving of the automobile.

(Modified Embodiment)

The descriptions relating to the embodiment described above only exemplify a mode that the vehicle notification device of the present invention may take, and are not intended to limit the form. For example, the vehicle notification device of the present invention may take the forms of the modified examples of the above-described embodiment shown below, as well as forms that combine at least two modified examples that are not mutually contradictory.

Figure 6:
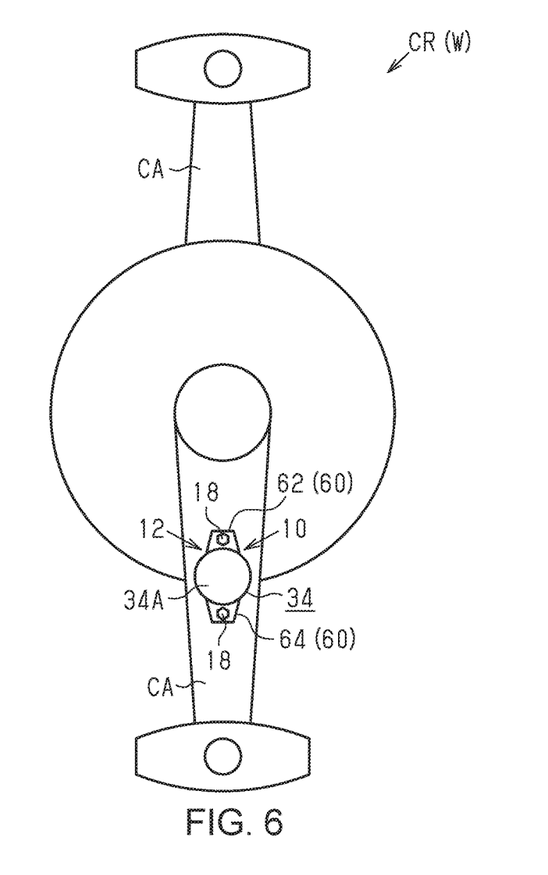
FIG. 6 is a side view of a crank to which is attached a vehicle notification device according to a modified embodiment.

The attachment position of the vehicle notification device 10 to the rotating body of the vehicle BK may be freely changed. In one example, the rotating body of the vehicle BK comprises a crank CR. In the example shown in FIG. 6, the vehicle notification device 10 is attached to the crank CR. Specifically, the vehicle notification device 10 is attached to the crank arm CA. The vehicle notification device 10 comprises an attaching portion 60 instead of the attaching portion 14. The attaching portion 60 is configured to be attachable to the crank CR. In one example, the attaching portion 60 comprises a first attaching portion 62 and a second attaching portion 64. The attaching portion 60 protrudes outward from the main body 34A of the housing 34. The attaching portion 60 includes a protrusion that, for example, protrudes in a direction that separates from the main body 34A of the housing 34. Holes into which a bolt 18 can be inserted are formed in the attaching portion 60 and the crank arm CA. A female thread that can be coupled with the bolt 18 is formed in the hole that is formed in the crank arm CA. The vehicle notification device 10 is attached to the crank arm CA by a first bolt 18 being inserted in the first attaching portion 62 and the crank arm CA, and a second bolt 18 being inserted in the second attaching portion 64 and the crank arm CA. The attaching portion 60 may be configured to be attachable to the crank arm CA by a band that has elasticity instead of a bolt. In this case, it becomes unnecessary to process the crank arm CA for attaching the vehicle notification device 10. Further, the attaching portion 60 may have a hole into which a pedal shaft of a pedal can be inserted, and may be attached by being sandwiched between a portion of the pedal shaft and the crank arm CA, in a state in which the pedal shaft is inserted therethrough.

The elements that configure the vehicle notification device 10 may be freely changed. In one example, the vehicle notification device 10 can be configured, omitting at least one of the wireless receiver 24, the power storage device 26, the first detector 30, and the second detector 32. In a preferred example, the elements that are omitted from the vehicle notification device 10 are provided to another device that is mounted on the vehicle BK.

The attaching portion 14 may be configured to be attachable to a hub of a wheel. The configuration of the attaching portion 14 may be changed to various forms, at long as the configuration can be attached to a spoke SP or a hub. For example, the attaching portion 14 may be configured to include a band with elasticity, and be attached to or detached from the spoke SP by the band.

DESCRIPTIONS OF THE REFERENCE SYMBOLS

10 . . . Vehicle notification device, 12 . . . Base portion, 14 . . . Attaching portion, 20 . . . Wireless transmitter, 22 . . . Power generator, 22A . . . Rotor, 22B . . . Coil, 22C . . . Piezoelectric element, 22D . . . Photoelectric element, 24 . . . Wireless receiver, 26 . . . Power storage device, 28B . . . Storage device, 30 . . . First detector, 32 . . . Second detector, 34 . . . Housing, 54 . . . Reflective sheet, 60 . . . Attaching portion, W . . . Rotating body, SP . . . Spoke, CR . . . Crank, BK . . . Vehicle, ED1 . . . External device that is external to the vehicle.

While only selected embodiments have been chosen to illustrate the present invention, it will be apparent to those skilled in the art from this disclosure that various changes and modifications can be made herein without departing from the scope of the invention as defined in the appended claims. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle notification device comprising:
a base portion having a vehicle mounting portion, the base portion comprises a housing;
an attaching portion that is provided on the base portion and which can be attached to or detached from a rotating body of a vehicle that is configured to be run by a manual drive force the attaching portion configured to he attached to a position spaced from a rotational axis of rotating body;
a wireless transmitter that is configured to transmit a non-visible wireless signal that notifies the presence of itself to an external device that is external to the vehicle, the wireless transmitter housed in the housing; and a power generator that generates electric power supplied to the wireless transmitter, the power generator and the wireless transmitter being enclosed in the base portion, and the power generator housed in the housing, at least a portion of the housing is of a material that is configured to transmit wireless radio waves, the power generator comprises a rotor rotated together with the rotation of the rotating body, the power generator further comprising a coil that is electromagnetically induced by the rotation of the rotor.

2. The vehicle notification device according to claim 1, wherein
the attaching portion is configured to be attachable to the rotating body such that the base portion is exposed outside of the rotating body.

3. The vehicle notification device according to claim 2, wherein
the rotating body comprises a spoke; and
the attaching portion is attachable to the spoke.

4. The vehicle notification device according to claim 1, wherein
the rotating body comprises a crank; and
the attaching portion is attachable to the crank.

5. The vehicle notification device according to claim 1, wherein
the power generator further comprises a piezoelectric element that vibrates to generate electric power that is applied to the power generator.

6. The vehicle notification device according to claim 1, wherein
the power generator further comprises a photoelectric element that generates electric power by sunlight.

7. The vehicle notification device according to claim 1, comprising
a power storage device that stores the electric power that is generated by the power generator.

8. The vehicle notification device according to claim 1, wherein
the power generator is provided on the base portion.

9. The vehicle notification device according to claim 1, further comprising
a first detector that detects a traveling speed of the vehicle, wherein
the wireless transmitter is configured to transmit wireless signals that include information according to a detection result of the first detector to the external device.

10. The vehicle notification device according to claim 9, wherein
the first detector comprises an acceleration sensor.

11. The vehicle notification device according to claim 9, further comprising
a second detector that detects position information of the vehicle, wherein
the wireless transmitter is configured to transmit wireless signals that include information according to an output of the second detector to the external device.

12. The vehicle notification device according to claim 11, wherein
the second detector comprises a GPS receiver.

13. The vehicle notification device according to claim 1, further comprising
a storage device that stores information relating to the type of the vehicle, wherein
the wireless transmitter is configured to transmit wireless signals that include information relating to the type of the vehicle to the external device.

14. The vehicle notification device according to claim 13, wherein
the storage device is configured to update the type of vehicle that is stored in the storage device.

15. The vehicle notification device according to claim 14, further comprising
a wireless receiver, wherein
the storage device is configured to update information stored in the storage device, according to a signal from the outside that is input to the wireless receiver.

16. The vehicle notification device according to claim 1, wherein
the wireless transmitter is provided on the base portion.

17. The vehicle notification device according to claim 1, wherein
the base portion comprises a reflective sheet that reflects light.

18. The vehicle notification device according to claim 1, wherein
the transmission frequency of the wireless transmitter is in the 700-900 MHz band, the 1700-3500 MHz band, or the 5900 MHz band.

19. The vehicle notification device according to claim 1, wherein
the vehicle mounting portion is detachably attached to the housing of the base portion such that the rotating body is disposed between the housing of the base portion and the vehicle mounting portion.

20. The vehicle notification device according to claim 1, wherein
the mounting portion includes an attaching surface that faces the housing of the base portion, the attaching surface being parallel to a surface of the base portion on which the wireless transmitter and the power generator are disposed.

21. The vehicle notification device according to claim 20, wherein
the mounting portion includes a receiving hole corresponding to a receiving hole of the housing of the base portion for receiving a fastener, the receiving holes being perpendicular to the attaching surface.

* * * * *